W. H. PALMER.
Machines for Sheeting Dough.

No. 148,321. Patented March 10, 1874.

WITNESSES.

INVENTOR.

UNITED STATES PATENT OFFICE.

WILLIAM H. PALMER, OF PHILADELPHIA, PENNSYLVANIA.

IMPROVEMENT IN MACHINES FOR SHEETING DOUGH.

Specification forming part of Letters Patent No. 148,321, dated March 10, 1874; application filed August 18, 1873.

*To all whom it may concern:*

Be it known that I, WILLIAM H. PALMER, of the city and county of Philadelphia, State of Pennsylvania, have invented a certain Improvement in Machines for Sheeting Dough, of which the following is a specification:

My invention relates to an improvement in dough-sheeting machines, in which a sheet is formed by forcing the dough, by means of a vertical-moving follower, through a longitudinal opening in the bottom of the receiver. In machines of this description, employing a vertical-moving follower or plunger, considerable delay is occasioned after the follower has reached the bottom of the vessel, and while it is making the return or upward movement. The present invention consists in substituting a screw or spiral-bladed wheel for the follower and threaded stem, thereby permitting the dough to be supplied continually, and the sheeting operation proceeded with without intermission.

Figure 1:
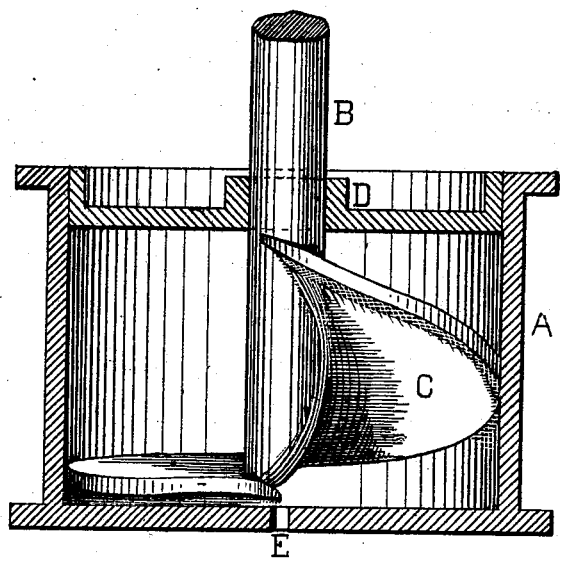
Figure 2:
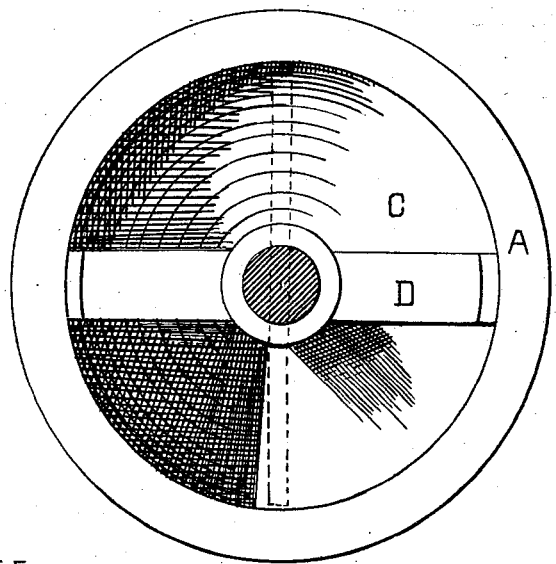

Figure 1 is a sectional elevation of the dough receiver or vessel, showing the arrangement of the screw for sheeting the dough. Fig. 2 is a plan view of the receiver and screw.

In the center of the cylindrical vessel A is placed a vertical shaft or spindle, B, the lower end of which is furnished with a screw or spiral-bladed wheel, C, which fits, and is caused to revolve, within the vessel by means of motive power communicated to the upper end of the shaft. Secured diametrically at the upper part of the cylinder A is a cross-bar, D, which acts as a support to the shaft B, and also as a stop to retain the dough down onto the screw while it is in motion. A longitudinal opening, E, is made in the bottom of the cylindrical vessel A, through which the dough carried down by the rotating screw is forced. The said opening is made of suitable dimensions, corresponding to the width and thickness required for the sheet of dough, or it may be made adjustable to regulate the thickness of the sheet. The dough supplied at the upper end of the vessel is brought directly in contact with the revolving screw, which imparts a spiral movement to it, carrying it downward, and pressing it against the bottom of the vessel with sufficient stress to project it through the longitudinal opening, from which it emerges in the form of a sheet.

It will be seen, on referring to Fig. 1, that the screw is so suspended within the cylinder that the lower end of it terminates within a short distance of the bottom of the vessel A, the object of which is to prevent the dough being severed at the longitudinal opening, which would otherwise occur should the terminus of the screw pass over and act in close contact with the inner edges of the said opening.

What I claim as my invention is—

In a machine for sheeting dough, a screw or spiral-bladed wheel, arranged to work within the receiver or cylindrical vessel, to force the dough through a longitudinal slot or opening, substantially as herein shown and described.

WILLIAM H. PALMER.

Witnesses:
ISAAC R. OAKFORD,
FRANCIS D. McGLENSEY.